United States Patent [19]

McGregor

[11] Patent Number: 4,708,758
[45] Date of Patent: Nov. 24, 1987

[54] METHOD OF MAKING A FLEXIBLE BEARING

[75] Inventor: James D. McGregor, Logan, Utah

[73] Assignee: Morton Thiokol, Inc., Chicago, Ill.

[21] Appl. No.: 911,548

[22] Filed: Sep. 25, 1986

[51] Int. Cl.$^4$ ............................................. B32B 31/20
[52] U.S. Cl. .................................. 156/245; 156/306.9;
156/307.7; 384/125; 384/129; 384/221;
384/907; 384/911; 384/912
[58] Field of Search ...................... 156/242, 245, 306.9,
156/307.7; 384/202, 221, 125, DIG. 907, DIG.
911, DIG. 912, 129; 464/83, 111

[56] References Cited

U.S. PATENT DOCUMENTS

| 2,943,009 | 6/1960 | Mirsky et al. | 384/221 |
| 3,869,113 | 3/1975 | Dudek | 384/221 |
| 3,941,433 | 3/1976 | Dolling et al. | 384/129 |
| 4,108,508 | 8/1978 | Clinard | 384/221 |
| 4,286,827 | 9/1981 | Peterson et al. | 384/221 |
| 4,291,925 | 9/1981 | Peterson et al. | 384/221 |
| 4,357,057 | 11/1982 | Peterson et al. | 384/125 |

Primary Examiner—Caleb Weston
Attorney, Agent, or Firm—Gerald K. White

[57] ABSTRACT

An improved laminated flexible bearing wherein alternate layers of elastomer and reinforced plastic shims of the lamination are cured simultaneously with heat and pressure and the lamination is bonded to forward and aft end rings for facilitating attachment of a thrust nozzle to a rocket case.

3 Claims, 5 Drawing Figures

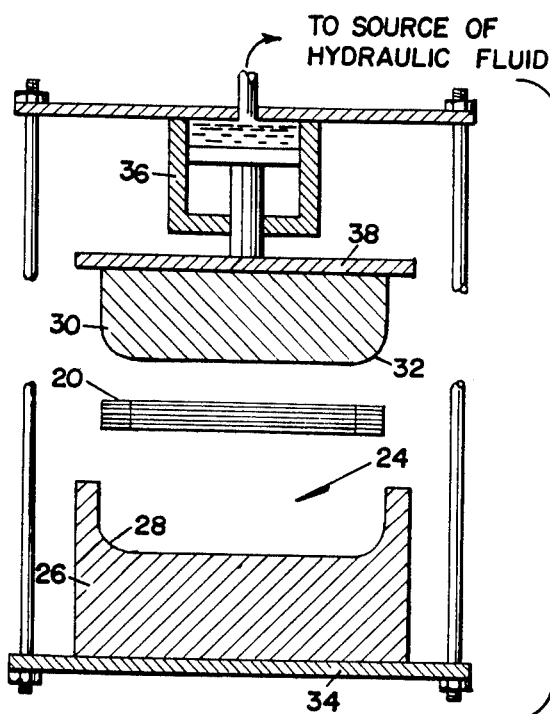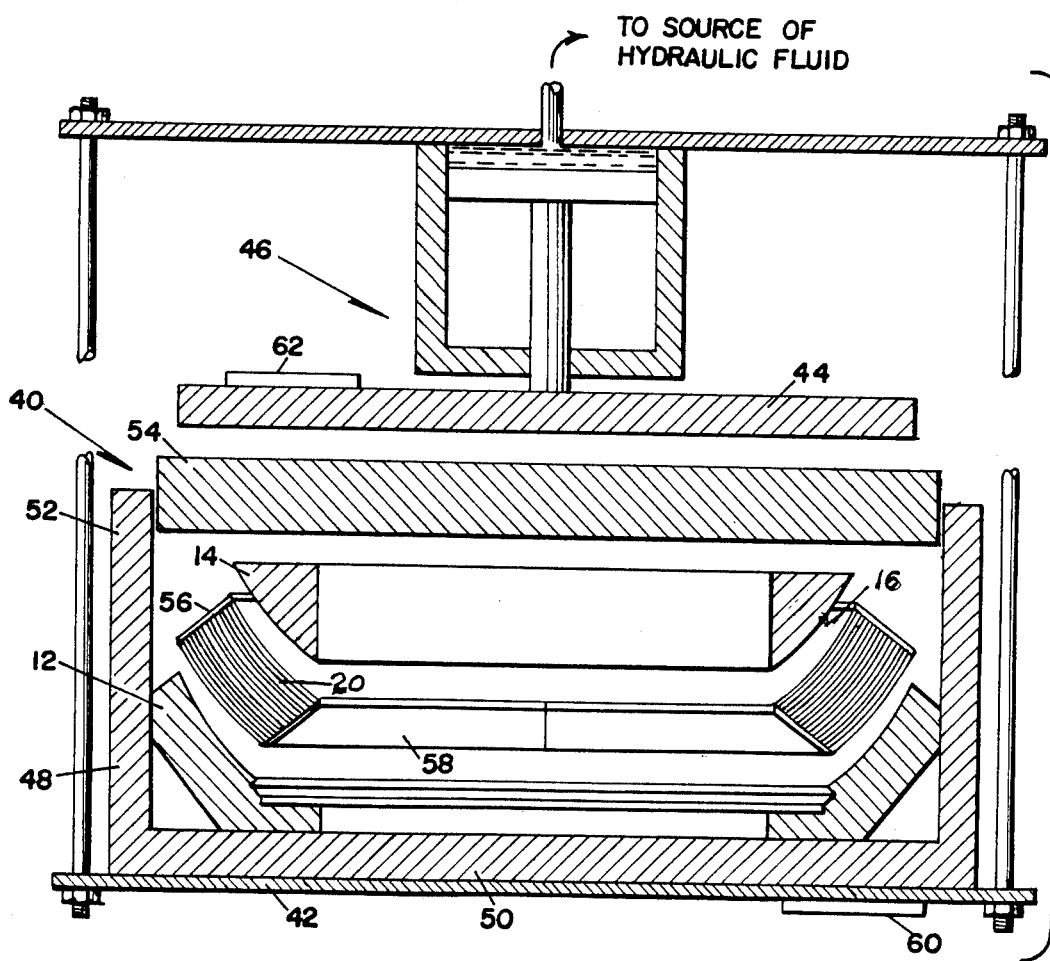

METHOD OF MAKING A FLEXIBLE BEARING

BACKGROUND OF THE INVENTION

1. Field of the Invention

The present invention relates to an improved flexible bearing and to an improved method of making flexible bearings.

2. Description of the Prior Art

It is known in the prior art to utilize in flexible bearings a lamination comprised of alternate layers of an elastomeric material and rigid reinforcement shims that are stacked and bonded together. With elastomer as both the top and bottom layers, the lamination is positioned between and bonded to metallic end rings. One end ring may comprise the thrust-nozzle ring of a rocket motor and the other the rocket case mounting ring. The lamination is characterized in that it is flexible in directions parallel to the layers, but is relatively unyielding in directions perpendicular thereto.

This type of flexible bearing has many uses in addition to mounting a movable thrust nozzle to a rocket motor case including applications to motor mounts and bridge abutments. In its application to mounting a movable thrust nozzle to a rocket motor case, the flexible bearing is annular in form. Additionally, the layers of elastomer and the rigid reinforcement shims are shaped to conform to the surfaces of concentric spheres thereby to enable the thrust nozzle to be rotated about a fixed point. This is desirable for precision control of the rocket.

A typical bearing of this type having practical application for mounting a movable thrust nozzle to a rocket motor case is disclosed in U.S. Pat. No. 3,941,433 issued on Mar. 2, 1976 to William T. Dolling et al., and assigned to the assignee of the present invention.

In U.S. Pat. No. 3,941,433 a preferred material for the rigid reinforcement shims is said to be a hightemperature steel. Reinforcement shims made of materials other than steel are also known. Thus, reinforcement shims have been fabricated from non-metallic materials such, for example, as glass cloth. Such reinforcement shims contain, in addition to the cloth, a resin or hardening material.

In the fabrication of such reinforcement shims from non-metallic materials for mounting a movable thrust nozzle to a rocket motor case, it has been the practice in the prior art to separately prefabricate, in cured form, each of the plurality of rigid reinforcement shims that are employed in the flexible bearing lamination. An individually associated mold has been required for each of the reinforcement shims because each reinforcement shim conforms to the surface of an individually associated sphere having its own, unique radius. Thus, in a lamination having nine reinforcement shims in the stack, for example, nine separate and different molds are required for the prefabrication of the shims.

This prior art practice involving a multiplicity of molds for the lamination of each flexible bearing being fabricated not only significantly and undesirably adds to the cost of the necessary tooling, but also is labor intensive. Such tooling and labor costs escalate and become particularly onerous where fabrication of flexible bearings of several different sizes is involved. This is because of the numerous molds required to be used and the necessity for guarding against mixup of the many prefabricated reinforcement shims being produced. Additionally, the rejection rate of laminations made from prefabricated rigid reinforcement shims has been undesirably high. As a result, it has been necessary to conduct a very thorough inspection of each prefabricated reinforcement shim for the flexible bearing lamination to determine if it is in conformance with the required standards for the specific use for which fabricated. This has significantly added further to the labor cost.

Thus, there exists a need and a demand in the art for improvement in flexible bearings and the method of making the same to the end of eliminating, or at least, reducing costly tooling and labor in the prefabrication of the reinforcement shims, and also in substantially reducing the rejection rate of finished bearings. The present invention was devised to fill the technological gap that has existed in the art in these respects.

SUMMARY OF THE INVENTION

An object of the invention is to make an improved flexible bearing and an improved method of making the same.

Another object of the invention is to provide such an improved method of making a flexible bearing which enables a substantial reduction in the cost of tooling and labor required in the fabrication thereof, and which eliminates also the need for inspection of prefabricated reinforcement shims.

A further object of the invention is to provide an improved flexible bearing comprising bearing end rings with a flexible lamination therebetween consisting of alternate layers of elastomeric material and reinforcement shims made of a suitable fabric impregnated with a resin, and fabricated by a process including the steps of:

(a) fitting together the end rings and the materials of the lamination into an assembly of desired geometry with the material of the impregnated reinforcement shims being uncured, and (b) subjecting the assembly to heat and pressure thereby to cause cure and vulcanization of the elastomeric material and the impregnated material of the reinforcement shims.

In accomplishing these and other objectives of the invention, the flexible bearing according to the invention is fabricated by assembling the end rings which may be made of a suitable metal, such as steel, with the lamination comprising alternate layers of elastomer and reinforcement shims therebetween, the latter being uncured. The reinforcement shims may be made of a number of materials by different processes including weaving, filament winding, etc. By way of example but not limitation, the reinforcement shims may be made of a suitable fabric material such as glass cloth impregnated with a suitable resin.

In one embodiment of the invention, six "quarter circle" plies of resin impregnated glass cloth, constituting a total of twenty-four patterns, are used for each layer of reinforcement shim. The resin content of the impregnated glass cloth may be in a range of about 20–23%.

The elastomer for the lamination may comprise calendered natural or synthetic rubber pads having good elastic and holding properties over a wide temperature range. A synthetic rubber formulation of polyisoprene may be employed for flexible bearing applications down to 0° F. (−17.77° C.). A silicone rubber formulation may be employed for applications down to −65° F. (−53.9° C.).

Prior to assembly of the flexible bearing, each reinforcement shim layer is compressed to form a preform but is not then cured. Specifically, the plies are placed in a mold the geometry of which is selected for the particular requirement of the reinforcement shim to be produced. With the mold top installed, the mold is placed in a press and pressure applied until the mold is seated. The reinforcement shim preform is then removed from the mold. To prevent sticking, a film such as Saran Wrap may be used on the concave and convex surfaces of the molds. The preforms may be painted on all surfaces with one coat of Chemlok 220, a product of Houston Chemical Co., a Division of Lord Manufacturing Co., Erie, Pa. Both end rings may be sandblasted and painted also with Chemlok 220.

In the above-mentioned embodiment of the invention, nine reinforcement shim preforms were used for the reinforcement shim layers and ten pads of polyisoprene rubber that had been calendered and debulked in a press to a thickness of 0.053 inches (0.1346 cm.) were employed as the layers of elastomer. A layer of elastomer was at the top and another at the bottom of the lamination.

The assembly of end rings with the lamination therebetween comprising the alternate layers of elastomer and uncured, compressed and compacted reinforcement shims is then placed in a mold, compressed and heated to a temperature of about 300° F. (150° C.) to cure and vulcanize the elastomeric material and the preformed reinforcement shims forming the lamination and to bond the latter to the end rings.

When the flexible bearing is to be used to attach a thrust nozzle to a rocket case, the inner surface of each of the end rings that is in contact with the lamination is shaped to conform to surfaces of concentric spheres to the end that the thrust nozzle may be rotated about a fixed point. When, in such applications, more than five or six reinforcement shims are required for the flexible bearing, the use of more than one mold for making the preformed reinforcement shims may be desirable, although it is not necessary, as in the prior art, to use a separately configured mold each with its own unique radius for each of the reinforcement shims. The use of several different molds when there are nine reinforcement shims to be preformed may be desirable in order to avoid difficulty in keeping the lamination symmetrical. The preforms must be allowed to assume their natural diameter. Any crowding of the preforms into a smaller diameter in the mold cavity tends to cause wrinkling of the preforms and subsequent wrinkles in the cured reinforcement shims.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying drawings which form part of the specification and in which like parts are designated by the same reference numbers, of which drawings:

FIG. 4 is an exploded view in partial cross section of a mold placed in a hydraulic press for compressing the resin pre-impregnated quarter circle plies of glass cloth, in forming the reinforcement shim preforms; and FIG. 5 is an exploded view in partial cross section of the assembly in a mold of stacked end rings, elastomer pads, and reinforcement shim preforms and placed in a hydraulic press for compressing and heating to cause cure and vulcanization of the elastomer and the reinforcement shim preforms of the lamination and bonding of the latter to the end rings.

DESCRIPTION OF THE PREFERRED EMBODIMENT

Figure 1:
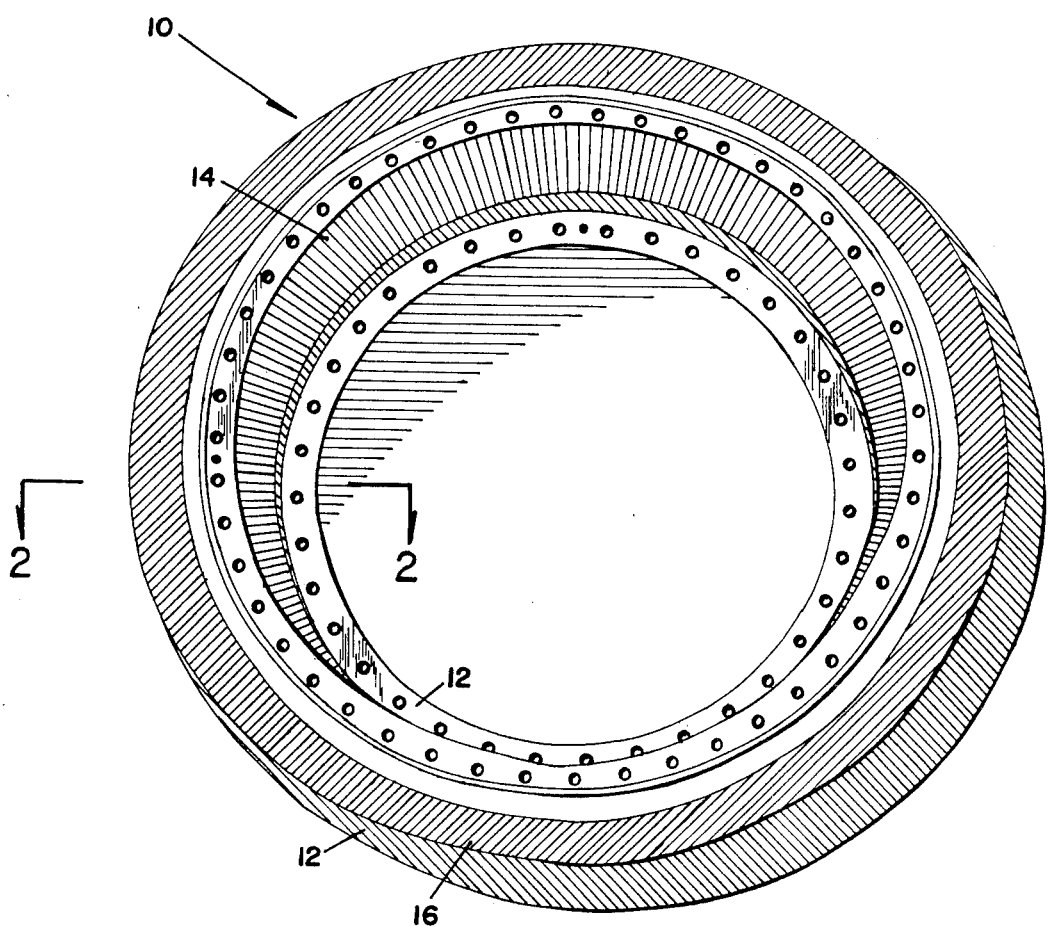
FIG. 1 is a perspective view of a flexible bearing made in accordance with the method of the present invention.
Figure 2:
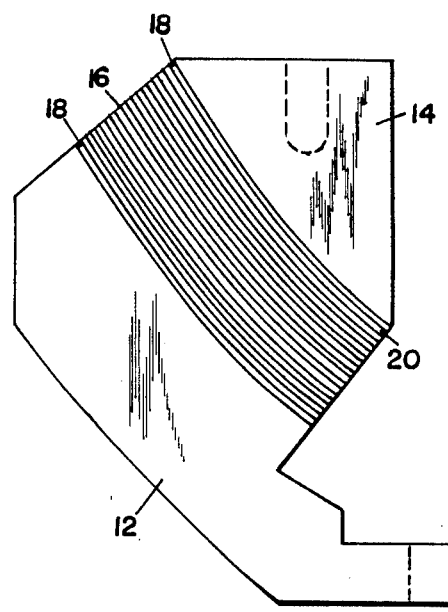
FIG. 2 is a cross section of the flexible bearing taken along the line 2—2 of FIG. 1.

A flexible bearing made in accordance with the improved method of the present invention is illustrated in FIGS. 1 and 2 of the drawings. Bearing 10 includes rigid end rings 12 and 14. For convenience, end ring 12 is termed a first end ring and ring 14 is termed a second end ring. When used for attaching a thrust nozzle to a rocket case, the bearing 10 is annular in form with the first end ring 12 comprising the forward end ring and the second end ring 14 comprising the aft end ring. Positioned between the first and second end rings 12 and 14, respectively, and bonded thereto is a lamination 16. Lamination 16 comprises alternate layers of elastomer 18 and rigid reinforcement shims 20 which are stacked and bonded together. In one embodiment of the invention, there are nine layers of rigid reinforcement shims 20 and ten layers of elastomer 18 with a layer of elastomer 18 being on both the top and the bottom of the lamination 16. The layers of rigid reinforcement shims 20 conform to surfaces of concentric spheres to the end that the rocket motor thrust nozzle (not shown) may be rotated about a fixed point.

Figure 3:
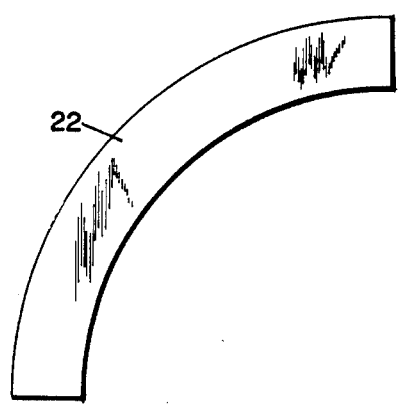
FIG. 3 is a plan view of a "quarter circle" ply of resin pre-impregnated glass cloth used in the fabrication of the reinforcement shim preforms.

In the fabrication of the preforms for the reinforcement shims 20 of the flexible bearing 10, a plurality of quarter circle reinforcement plies 22, as shown in FIG. 3, are cut or stamped from a sheet of resin pre-impregnated fabric such as glass cloth, with the size of each ply 22 being appropriate for the size of the bearing 10 being fabricated. The plies may be made from pre-impregnated glass cloth E760D/S-915 broadgoods that are commercially available from U.S. Polymeric, Santa Ana, Calif. and contain a resin content in the range of 20–25% by weight.

With this approach used for the layup of the plies for the reinforcement shims 20, it is desirable to compact the quarter circle plies or preforms before layup of the lamination 16. It has been found that a lot of bulk will lead to wrinkling of the preforms during bearing debulk. Bulk also adds to the difficulty of getting good concentric layup of the lamination. Six quarter circle plies of pre-impregnated glass cloth, making up a total of twenty-four patterns or segments, were used for each reinforcement shim layer.

To achieve good sticking and compacting, each reinforcement shim layer preform was laid up in a mold 24, as shown in FIG. 4. Where five or fewer reinforcement shims are to be used in the lamination 16 for the flexible bearing 20, a single preform mold 24 may be employed to compress and compact all of the reinforcement shim preforms. Where a larger number of reinforcement shims 20 are used in the lamination 16, however, it is preferred to use at least two molds better to accommodate the differences in the radii of the reinforcement shims at different positions in the lamination. Each mold 24 includes a bottom portion 26 having a concave surface 28 therein and an upper portion or top 30 having a convex surface 32 therein. Mold 24 is positioned with bottom portion 26 resting on the surface of a lower plate 34 of a hydraulic press 36. A second and upper plate 38 of the hydraulic press 36 is adapted to be brought down under the force of hydraulic means that are well understood in the art, into engagement with the upper portion 30 of mold 24 for pressing and compacting the plies 22 of the reinforcement preform. A hydraulic press consists of a cylinder fitted with a sliding piston that exerts force upon a confined liquid. The liquid, in turn, produces a force upon the plate 38. The liquid is forced into the cylinder by a pump (not shown).

After the plies 22 for a reinforcement shim preform are placed in a mold 24, the mold top 30 is installed. The mold 24 is then placed in the hydraulic press, as indicated in FIG. 4, and pressure applied until the mold 24 is seated. To prevent sticking, a film such as Saran Wrap may be used to cover the concave and convex surfaces of the molds. The shaped preforms may be painted on all surfaces with a coat of Chemlok 220. Both end rings may be sandblasted and painted with Chemlok 220.

As used herein, the term "elastomer" refers to any flexible, stretchable material, including natural rubber, polyisoprene, silicon rubber, etc. In one embodiment of the invention, the elastomer comprised polyisoprene calendered to a thickness of 0.053 inches (0.1346 cm.).

In the layup of the lamination 16, care must be taken to keep the lamination 16 symmetrical. The preforms forming the reinforcement shims 20 must be allowed to assume their natural diameter. Any crowding of the preform into a smaller diameter because of the need to keep the preform in the mold cavity will cause wrinkling of the preform and subsequent wrinkles in the cured rigid reinforcement shim formed thereby. Compacting the lamination 16 during layup helps. This may be done by using the top portion of an appropriate shim mold.

Debulk and cure may be effected, as illustrated in FIG. 5, by placing the assembly of the end rings 12 and 14 and the alternate layers of elastomer 18 and reinforcement shim preforms 20 into a mold 40 and then placing the mold 40 between the bottom and top plates 42 and 44, respectively, of a hydraulic press 46. The mold 40 includes a bottom portion 48 having a base 50 and a cylindrical side wall 52 and a circular top portion 54.

A first circular band 56 is positioned around the outer diameter of the lamination 16 and a second circular band 58, which may be segmented, made up of four sections, for example, is positioned against the inner diameter of the lamination 16. Bands 56 and 58 contain the alternate layers of elastomer 18 and reinforcement shim preforms 20 and thus facilitate the application of pressure thereto to effect cure and vulcanization. Heat is applied to the lamination 16 simultaneously with the application of pressure thereto by electrically energized Calrod elements 60 and 62 that are operatively associated with the plates 42 and 44, respectively, of the hydraulic press 46. Plates 42 and 44 apply pressure to the end rings 12 and 14 with the lamination 16 therebetween under the force of hydraulic pressure.

As those skilled in the art will understand, a single hydraulic press 46 may be employed, if desired, to serve the functions of the hydraulic press 36 for compressing and compacting the reinforcement preforms and for pressing and heating the lamination 16 and end rings 12 and 14. With such use of the hydraulic press 46, the Calrod heating means would not be energized during the compressing and compacting operation forming the reinforcement shim preforms.

Thus, in accordance with the invention, there has been provided an improved method of making a flexible bearing comprising bearing end rings with a flexible lamination therebetween consisting of alternate layers of elastomeric material and reinforcement shims made of a suitable fabric material impregnated with a resin, and fabricated by:

(a) fitting together the end rings and the materials of the lamination into an assembly of desired geometry with the material of the impregnated reinforcement shims being preformed but uncured, and (b) subjecting the assembly to heat and pressure thereby to cause cure and vulcanization of the elastomeric material and the impregnated material of the reinforcement shims, and bonding of the lamination to the end rings.

There has also been provided an improved flexible bearing comprising bearing end rings with a flexible lamination therebetween consisting of alternate layers of elastomeric material and reinforcement shims made of a suitable fabric material impregnated with a resin and fabricated by a process comprising the steps of the improved method according to the invention.

With this description of the invention in detail, those skilled in the art will appreciate that modifications may be made to the invention without departing from the spirit thereof. Therefore, it is not intended that the scope of the invention be limited to the specific embodiment illustrated and described. Rather, it is intended that the scope of the invention be determined by the appended claims.

What is claimed is:

1. The method of making a flexible bearing that is fabricated of first and second rigid end rings with flexible laminations therebetween consisting of alternating layers of elastomeric material and rigid reinforcement shims made of suitable fabric material impregnated with a resin, wherein the surface of each of the first and second end rings adjacent the lamination and the surfaces of the layers of elastomer and rigid reinforcement shims of the lamination conform to surfaces of concentric spheres, comprising the steps of:

fitting together the end rings and lamination materials into an assembly of desired geometry with the resin impregnated fabric material being uncured, where, prior to fitting together the end rings and lamination into an assembly, each of the layers of resin impregnated fabric material is formed into a reinforcement preform by pressing and compacting, wherein the reinforcement preforms are formed one at a time in a first mold configured to make the surfaces of the preforms conform to the surfaces of concentric spheres, and wherein the first mold is placed in a press for effecting pressing and compacting each preform, and subjecting the assembly to heat and pressure thereby to cause cure and vulcanization of the elastomeric material and reinforcement shims.

2. The method as defined by claim 1 wherein the assembly of end rings and lamination materials is placed in a second mold including a first band contiguous with the outer diameter of the lamination and a second band contiguous with the inner diameter of the lamination for containing the material of the lamination, and wherein the second mold is placed in a heat producing press to press and heat the lamination.

3. The method as defined by claim 2 wherein the second band is segmented.

* * * * *